(12) United States Patent
Brinkmeyer et al.

(10) Patent No.: US 9,702,975 B2
(45) Date of Patent: Jul. 11, 2017

(54) LIDAR MEASURING SYSTEM AND LIDAR MEASURING METHOD

(71) Applicant: Technische Universität Hamburg-Harburg, Hamburg (DE)

(72) Inventors: Ernst Brinkmeyer, Buchholz (DE); Thomas Waterholter, Rellingen (DE)

(73) Assignee: Technische Universität Hamburg-Harburg, Hamburg (DE)

( * ) Notice: Subject to any disclaimer, the term of this patent is extended or adjusted under 35 U.S.C. 154(b) by 72 days.

(21) Appl. No.: 14/442,052

(22) PCT Filed: Nov. 11, 2013

(86) PCT No.: PCT/EP2013/073527
§ 371 (c)(1),
(2) Date: May 11, 2015

(87) PCT Pub. No.: WO2014/072514
PCT Pub. Date: May 15, 2014

(65) Prior Publication Data
US 2015/0301178 A1    Oct. 22, 2015

(30) Foreign Application Priority Data
Nov. 12, 2012   (EP) .................................... 12192232

(51) Int. Cl.
*G01S 17/95* (2006.01)
*G01S 17/32* (2006.01)
(Continued)

(52) U.S. Cl.
CPC ............ *G01S 17/32* (2013.01); *G01S 7/4818* (2013.01); *G01S 17/58* (2013.01); *G01S 17/95* (2013.01); *G01S 2007/358* (2013.01)

(58) Field of Classification Search
CPC ........ G01S 17/32; G01S 7/4818; G01S 17/58; G01S 17/95; G01S 2007/358
See application file for complete search history.

(56) References Cited

U.S. PATENT DOCUMENTS 6,739,511 B2 *   5/2004   Tsikos .................... G02B 26/10
                                                        235/462.01
2004/0019282 A1   1/2004   Mullen et al.
(Continued)

FOREIGN PATENT DOCUMENTS

EP            2128588 A1     12/2009
WO    WO-2005/114253 A1     12/2005

OTHER PUBLICATIONS

"International Application Serial No. PCT/EP2013/073527, International Preliminary Report on Patentability dated May 12, 2015", (w/ English Translation), 26 pgs.
(Continued)

*Primary Examiner* — Tony Ko
(74) *Attorney, Agent, or Firm* — Schwegman Lundberg & Woessner P.A.

(57) ABSTRACT

The present invention relates to a lidar measurement system for the detection of the presence and/or motion of particles and/or objects in a space region remote from the lidar measurement system and comprising an interferometer arrangement, as well as to a corresponding method using such a measurement system. The interferometer arrangement comprises a continuous wave laser source (2), a photodetector arrangement (7), and optical components which are adapted to split light (23) emitted by the continuous wave laser source (2), to guide it along a first optical path constituting a measurement branch (4) and along a second optical path, which is separate from the first optical path and constitutes a reference branch (5), and to eventually have it incident in a spatially coherently superimposed
(Continued)

Figure 1:
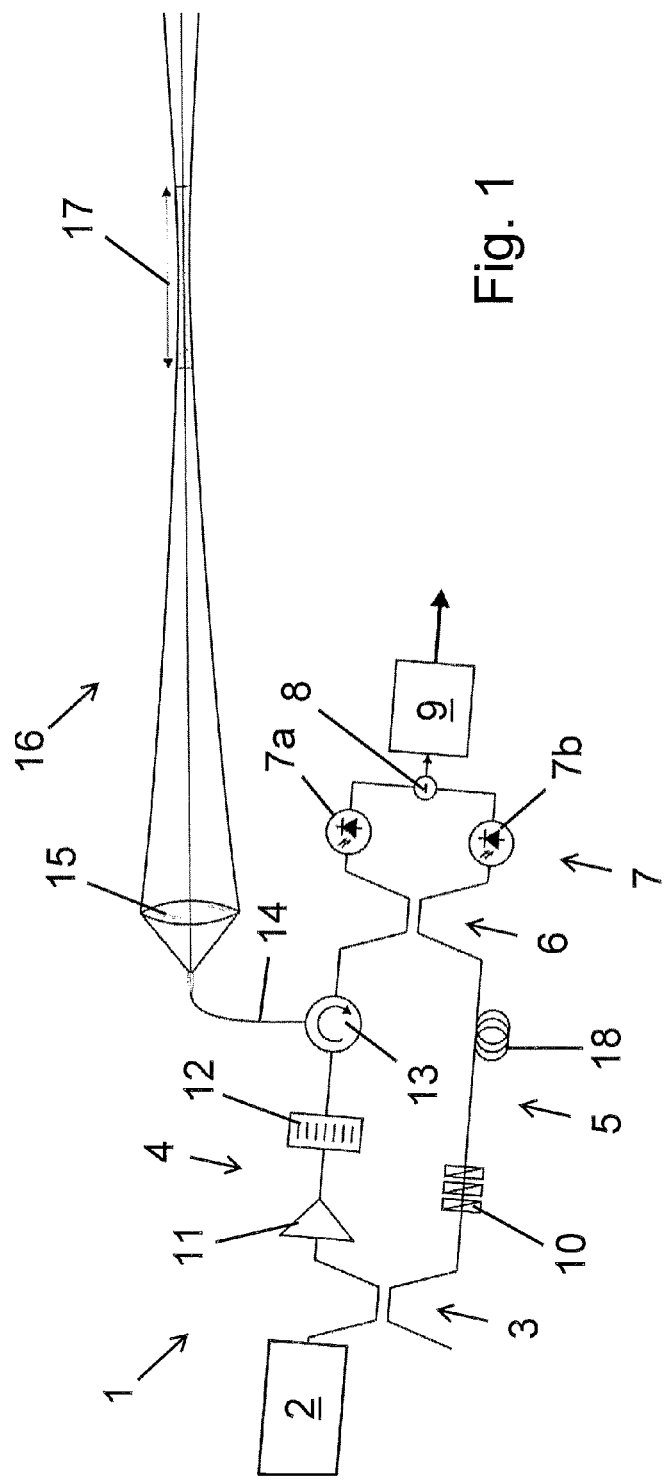

manner onto the photodetector arrangement (7). The reference branch (5) has a predetermined optical path length, and the measurement branch (4) comprises a measurement portion (16), in which the light is directed away from the measurement system towards a space region remote from the measurement system and passes through the space region and light backscattered towards the measurement system by particles present in the space region is received again at the measurement system. Further, an evaluation unit (9) is provided which is coupled to the photodetector arrangement (7) and is adapted to receive the detector signal thereof and to determine from the detector signal the presence and/or movement of particles in the remote space region. The continuous wave laser source (2) has a coherence length in the range of 0.1 to 100 m.

23 Claims, 2 Drawing Sheets

(51) Int. Cl.
*G01S 17/58* (2006.01)
*G01S 7/481* (2006.01)
*G01S 7/35* (2006.01)

(56) References Cited

U.S. PATENT DOCUMENTS

| 2007/0046945 | A1 | 3/2007 | Schwiesow |
| 2009/0257743 | A1 | 10/2009 | Chung et al. |
| 2012/0194823 | A1 | 8/2012 | Moore |

OTHER PUBLICATIONS

"International Application Serial No. PCT/EP2013/073527, International Search Report mailed Feb. 5, 2014", (w/ English Translation), 11 pgs.

"International Application Serial No. PCT/EP2013/073527, Written Opinion mailed Feb. 5, 2014", (w/ English Translation), 24 pgs.

Brinkmeyer, Ernst, et al., "Continuous wave synthetic low-coherence wind sensing Lidar: motionless measurement system with subsequent numerical range scanning", *Optics Express*, 21(2), (2013), 1872-1897.

Buettner, L., et al., "A multimode-fibre laser-Doppler anemometer for highly spatially resolved velocity measurements using low-coherence light", *Meas. Sci. Technol.*, 12, (2001), 1891-1903.

Cole, Zachary, et al., "Coherent Lidar Range Processing of Broadband Optical Noise Waveforms", *2005 Quantum Electronics and Laser Science Conference (QELS)*, (2005), 1994-1996.

Gao, Shuang, et al., "Complex-optical-field lidar system for range and vector velocity measurement", *Optics Express*, 20(23), (2012), 25867-25875.

Li, Youzhi, et al., "Ultrawideband coherent noise lidar range-Doppler imaging and signal processing by use of spatial-spectral holography in inhomogeneously broadened absorbers.=", *Applied Optics*, 45(25), (2006), 6409-6420.

Piracha, Mohammad Umar, et al., "Range resolved lidar for long distance ranging with sub-millimeter resolution", *Optics Express*, 18(7), (2010), 7184-7189.

Van Leeuwen, 'Ton G., et al., "Measurement of the Axial Point Spread Function in Scattering Media Using Single-Mode Fiber-Based Optical Coherence Tomography", *IEEE Journal of Selected Topics in Quantum Electronics*, 9(2), (Mar./Apr. 2003), 227-233.

* cited by examiner

LIDAR MEASURING SYSTEM AND LIDAR MEASURING METHOD

This application is a U.S. National Stage Filing under 35 U.S.C. 371 from International Application No. PCT/EP2013/073527, filed on Nov. 11, 2013, and published as WO 2014/072514 A1 on May 15, 2014, which claims the benefit of priority to European Patent Application No. 12192232.2, filed on Nov. 12, 2012, which are hereby incorporated by reference herein in their entireties.

The present invention relates to a lidar measurement system for the detection of the presence and/or movement of particles and/or objects in a region of space remote from the lidar measurement system, and to a method for the detection of the present and/or movement of particles and/or objects in a remote space region by means of such a lidar measurement system.

Lidar (light detection and ranging) is a method closely related to radar which, instead of the radar waves utilized in the case of radar, utilizes laser light. With it a remote measurement of various atmospheric parameters and, in particular, remotely a determination of the presence, the distance and the velocity of particles and other objects present in the air or another atmosphere can be carried out. In principle all particles scattering the used light and all objects can be measured which constitute a reflective discontinuity in space or a scattering body.

Thus, lidar addresses the need, existing in various areas of technology, to determine physical parameters at locations remote from the actual measurement apparatus in a spatially resolved manner, wirelessly and noninvasively as a function of time. For example, by means of lidar it is possible to determine via the measurement of particles moved by wind the wind velocity existing at a location space from the measurement apparatus. This can be utilized, for example, to measure in a simple manner the wind velocity at a distance of several hundred meters in front of a wind energy installation and to adapt on the basis of the measured wind velocity control parameters of the wind energy installation in such a manner that an efficiency as optimum as possible is achieved and at the same time the load of the wind energy installation by the wind is kept as low as possible, and to timely take emergency measures, such as an emergency shutdown, where appropriate in the case of extreme wind gusts in order to prevent damage to the wind energy installation.

Known lidar systems for determining wind velocities are based on the detection of the Doppler frequency shift of the scattered light caused by the scattering of laser light by particles moved with the wind (see, e.g., C. Weitkamp, Lidar-Range-resolved optical remote sensing of the atmosphere, Springer 2005). Therefore, it is in each case only possible to determine the wind velocity in the line of sight of the laser beam utilized.

In most cases, the Doppler frequency shift is determined interferometrically by superposition of the scattered light received at a measurement apparatus with direct light of the laser source utilized. For this purpose, in the prior art highly coherent laser sources having coherence lengths of several hundred meters are used, which correspond to optical source bandwidths in the sub-megahertz range. In the prior art two different approaches for obtaining spatial resolution are generally known.

According to the one approach continuous wave laser sources are utilized, the beam of which is focused by means of a suitable optical system, such as a lens or a telescope, to the respective desired target distance (see, e.g., WO 2005/114253 A1). Upon suitable focusing the major portion of the received scattered light then in principle comes from the region near the focus, so that by shifting the focus region different sub-portions of a space region of interest at different distances can be analyzed.

However, in this regard there is the general problem that the effective focal length increases approximately quadratically with the distance from the optical system used for the focusing, so that for large distances only a poor spatial resolution is achievable. Further, in each case scattered light of particles outside the focus region is also received. If such particles have a larger scattering cross-section than the particles within the focus region or are present in a much higher concentration than the particles within the focus region, their scattered light can nevertheless constitute the major portion of the received scattered light and superimpose the signal from the focus region. Without sophisticated measures the measured wind velocity would then be associated with an incorrect location. One example is a blanket of clouds, which is present, possibly significantly, behind the target region, i.e. the focus region. Finally, it is disadvantageous that the change of the focusing, which is generally carried out mechanically, requires additional instrumentation expenditure and takes up a significant amount of time.

According to the other approach pulsed laser sources are utilized, wherein the location determination is carried out via a measurement of the propagation time of the laser pulses. In this manner, it is possible with a pulse, the pulse width of which determines the spatial resolution, which for pulses having a width of 200 ns is for example 30 m, to successively scan multiple resolution elements between, e.g., 0 and 300 m distance from the measurement system. These resolution elements are respective sub-portions of the space region of interest, which is traversed by the laser pulses.

However, due to the fact that each resolution element is illuminated by the pulse for a short period of time only, typically poor signal/noise ratios regularly result, and the frequency resolution and, thus, also the wind velocity resolution is limited due to the short pulse widths. Moreover, it is usually necessary to utilize relatively sophisticated laser systems having a master oscillator and a power amplifier.

It is an object of the present invention to provide a lidar measurement system of simple construction and a lidar measurement method which is simple to carry out, by means of which system and method the presence and/or movement of particles in an extended remote space region can be determined quickly, flexibly and with a high spatial resolution and the above disadvantages are avoid.

This object is achieved by a lidar measurement system having the features of claim 1 and by a method having the features of claim 14. Advantageous embodiments of the lidar measurement system and the method are the subject matter of the respective associated dependent claims.

According to the present invention it is provided that a lidar measurement system for the detection of the presence and/or motion of particles and/or objects in a region of space remote from the lidar measurement system comprises an interferometer arrangement having a continuous wave laser source, a photodetector arrangement, various optical components for guiding of light of the continuous wave laser source along predetermined optical paths and an evaluation unit.

The photodetector arrangement is adapted to output a detector signal which is characteristic of light incident thereon, which light comes from the continuous wave laser source. The photodetector arrangement may comprise one or more photodetectors.

The optical components are adapted and arranged in such a manner that light emitted in operation by the continuous wave laser source is at first divided or split, is subsequently guided along a first optical path, which constitutes a measurement or signal branch of the interferometer arrangement, and along a second optical path, which is separate from the first optical path and constitutes a reference branch of the interferometer arrangement, and after having passed through the measurement branch and the reference branch is eventually incident in a spatially coherent superimposed manner onto the photodetector arrangement. Thus, the interferometer arrangement has the construction of a Mach-Zehnder interferometer. In this regard, the reference branch has a predetermined optical path length, and the measurement branch comprises a measurement portion, in which the light is oriented or directed away from the measurement system towards a space region remote from the measurement system and at least partially passes through it and light backscattered or reflected towards the measurement system by particles or objects present in the measurement portion is received again at the measurement system.

In other words, a portion of the optical path of the measurement branch, namely the measurement portion, is constituted by the region of the environment of the measurement system, from which region at all photons, which propagate from the measurement system towards the remote space region until they are scattered at a particle or reflected at an object, return again to the measurement system and are coupled there into the remainder of the measurement branch. This necessitates that on the one hand at the beginning of the measurement portion the laser light passing through the measurement branch is emitted by means of a suitable means towards the remote space region, and that on the other hand at the end of the measurement portion a portion of the scattered light is received with a suitable receiving means and is subsequently guided along the remainder of them measurement branch. The optical path length of the measurement branch is therefore determined for each photon by the distance of the particles or objects from the measurement system, from which the scattered or reflected light reaching the photodetector arrangement comes.

From the above explanations it can be taken that the remote space region constitutes a portion of the measurement portion and can, in the extreme case, be identical with the measurement portion. The measurement portion includes the region of the environment of the measurement system, from which at all light backscattered by particles or reflected by objects is coupled into the remainder of the measurement branch. In comparison, the remote space region is the region of interest for the detection, which region can be chosen to be smaller or at most equal to the measurement portion.

The evaluation unit is coupled to the photodetector arrangement and adapted to receive its detector signal and to determine on the basis of the detector signal the presence and/or movement of particles and/or objects in the remote space region. The latter can take place, for example, in particular in the same manner as is known from the prior art. In particular, the determination of the movement and thereby the velocity can be effected in a known manner via the determination of the Doppler shift of the detected light.

The continuous wave laser source is configured such that it comprises a coherence length in the range of 0.1 to 100 m, preferably in the range of 1 to 100 m, more preferably in the range of 1 to 50 m. Because coherent interference at the photodetector arrangement is only possible for scattered light from particles or reflected light of objects, for which particles and objects, respectively, the optical path length of the measurement branch coincides within the coherence length with the optical path length of the reference branch, a high spatial resolution, which can be selected by means of suitably choosing the coherence length, is achieved by the strongly limited coherence length. In contrast, scattered light or reflected light reaching the detector arrangement from particles and objects, respectively, located outside this coherence region merely results in a high bandwidth background in the detector signal, which may result in a limited reduction of the signal/noise ratio, but does not affect the spatial resolution. Thus, if the coherence region is smaller than the extension of the remote space region along the laser beam, only a sub-portion of the remote space region is measured, so that by shifting the coherence region—for example by means of an optional means for changing the optical path length of the reference branch, but preferably by calculation in the manner explained in detail further below—a spatial resolution determined by the extension of the coherence region can be achieved. Advantageously, the spatial resolution is independent of the distance of the respective analyzed sub-portion, which may also be designated as resolution element.

In a preferred embodiment the continuous wave laser source comprises a laser light generation component, a downstream optical phase modulator and a control device for controlling the optical phase modulator. The optical phase modulator is adapted to receive the laser light emitted by the laser light generation component and to modulate it in its phase. The phase modulator comprises a control signal input and is further adapted to carry out the phase modulation on the basis of a phase function which is defined by a control signal received at the control signal input. The control device is connected to the control signal input and adapted to provide to the control signal input a control signal corresponding to a noise signal or pseudo random noise signal defined by a predetermined phase function $\theta(t)$, wherein the control signal has the effect that the optical phase modulator carries out the phase modulation with the predetermined phase function $\theta(t)$. In this manner, the optical power density spectrum of the laser light emitted by the continuous wave laser source is provided with a shape, which may, e.g., be Gaussian or Lorentz-shaped, and bandwidth determined by the phase function $\theta(t)$. Thus, the continuous wave laser source can be referred to as a synthetic laser source, for which, in contrast to natural laser sources, the phase function is known, which results in a spectral broadening and deformation of the monochromatic laser light. In this regard, in the usual manner the bandwidth determines the coherence length. In this manner, advantageously the same laser light generation component can be utilized for realizing different coherence lengths and, thus, spatial resolutions. The laser light generation component, which may in particular be a narrow-band and preferably a single mode continuous wave laser diode, preferably has a bandwidth of 100 kHz or less and more preferably of 10 kHz or less.

In this embodiment it is in particular preferred if the predetermined phase function $\theta(t)$ is adjustable. Such an adjustability provides the possibility of the adjustability of the spectral shape and/or the bandwidth of the laser light emitted by the continuous wave laser source. For example, for each desired spectral shape and/or bandwidth a corresponding phase function $\theta(t)$ can be found by means of an iterative numeric method.

In the context of such an iterative method one starts, for example, from a randomly selected phase function, i.e. a random phase behavior, or a specifically selected phase function, and by means of calculation the spectral shape and bandwidth of the laser light output by the optical phase modulator controlled by this phase function is determined and compared with the desired spectral shape and bandwidth. On the basis of the comparison the phase function is modified and the above steps are repeated. The method is continued until the desired result is obtained with sufficient precision. In particular, such an iterative method can be carried out by starting from a spectrum having a Gaussian contribution and random phase. From that, the phase of the associated electrical field strength is calculated by inverse Fourier transformation and its amplitude is set to be constant. From the electrical field strength obtained in this manner the associated spectrum is calculated by Fourier transformation, and with the phase thereof the iteration process is started from the beginning. The process is continued until the desired result, e.g. a predefined Gaussian amplitude and power density spectrum, is obtained with sufficient precision. Independent of the particular configuration it has to be noted that the calculation time that needs to be spent for an iterative method is irrelevant insofar as a phase function once found can be utilized permanently.

This configuration has the great advantage that the spatial resolution can be changed without having to carry out modifications as to the hardware or a mechanical movement of components. It is only necessary to select or to adjust or set another suitable phase function $\theta(t)$ at the control device. Different to known continuous wave lidar systems in which—as mentioned above—the spatial resolution is severely limited by the limited focusability of a laser beam, in particular at large distances, the spatial resolution can be freely selected in a wide range simply, flexibly and quickly with high reproducibility. At the same time, in the manner already described, possible interferences or perturbations resulting from scattering at particles or reflection at objects outside the sub-portion of the remote space region determined by the coherence length and the optical path length of the reference branch, such as, for example, particles in clouds in front of or behind the sub-portion, are reliably suppressed, and, thus, the risk of an incorrect association of measured velocity values to locations is strongly reduced.

In the described embodiments, in which an optical phase modulator is provided, it is further preferred if the evaluation unit is adapted to carry out the evaluation on the basis of a function of the detector signal, the predetermined phase function and a time shift value $\Delta t_{shift}$, which function is chosen such that the result of the function corresponds to the detector signal which would result upon the choice of a reference branch which, as compared to the actual reference branch, has a propagation time changed by $\Delta t_{shift}$ and, thus, also an optical path length changed accordingly.

This configuration is based on the recognition that the detector signal does not only include the information required for the evaluation about particles and objects in the sub-portion of the remote space region corresponding to the actual optical path length of the reference branch and the coherence length, but also already the respective information about particles and objects in other sub-portions of the remote space region in other distances from the measurement system. For the evaluation of the entire remote space region or a larger sub-portion thereof the knowledge of the phase function $\theta(t)$ used for controlling the optical phase modulator and for the corresponding generation of the light emitted by the continuous wave laser source is required.

This phase function is not known for a natural laser source and would have to be determined in a complex and time-consuming manner. By contrast, with the continuous wave laser source used here the phase characteristics of the laser beam are generated synthetically, are only pseudo random and are available numerically in the form of the phase function $\theta(t)$. This phase function $\theta(t)$ is represented in a particular manner in the complex amplitude of the detector signal, which complex amplitude can be selectively modified numerically on the basis of the knowledge of the phase function $\theta(t)$ in order to thereby fake or fabricate for the purposes of the evaluation an optical path length of the reference branch deviating from the actual or true optical path length.

Thus, in an advantageous manner it is possible without changes as to hardware and without mechanical movement of components to retroactively shift without new measurement the sub-portion of the remote space region, from which sub-portion the light comes which, in the described manner, coherently interferes with the light of the reference branch and is used for detection, i.e. the position of the resolution element. Different from the case of known continuous wave lidar methods it is possible to obtain with a single measurement information from a large region and not only from the focus region, and the spatial resolution can be chosen selectively and independent of distance. In this manner it is possible very easily and flexibly to carry out a spatially resolved measurement at different sub-portions of the remote space region with an adjustable spatial resolution and, thus, to determine remotely particular properties and characteristics of the different sub-portions.

Therefore, against this background, if in connection with the evaluation and the corresponding coherence region optical path length is mentioned, it is intended to refer to this "faked" optical path length.

With respect to this "numerical shift" of the sub-portion it is advantageous if the function includes the multiplication of the detector signal with the factor $$e^{-i[\theta(t+\Delta t_{shift})-\theta(t)]}.$$

It can be shown that the complex detector signal—possibly in addition to time-constant components or portions—includes a time-variable component or portion which is proportional to $$e^{i[\theta(t+t_d)-\theta(t)]},$$

wherein $t_d$ is the propagation time difference or delay difference between reference branch and measurement branch determined by the distance of the scattering particles. The multiplication with the above factor therefore results in a time-variable component or portion which is proportional to $$e^{i[\theta(t+t_d)-\theta(t+\Delta t_{shift})]}$$

and, thus, corresponds to a deviating optical path length of the reference branch determined by $\Delta t_{shift}$.

In a preferred embodiment the optical components comprise a beam splitter, such as, for example, in particular a fiber optical coupler, for splitting or dividing the light emitted by the continuous wave laser source, optical fibers, which define at least a portion of the reference branch, and/or optical fibers, which define a portion of the measurement branch, an optical frequency shifter, constituted, e.g., by an acoustooptical modulator, in the measurement branch and/or in the reference branch, an optical amplifier, e.g. an erbium fiber amplifier, in the measurement branch or prior to the division into measurement branch and reference branch, an adjustable polarization control device in the reference branch and/or in the measurement branch, and/or a beam combiner, in particular a fiber optical coupler, for combining the light guided along the measurement branch and along the reference branch at the end of the measurement branch and of the reference branch.

In a preferred embodiment the optical components include an emission and reception means or arrangement, which defines the beginning and the end of the measurement portion of the measurement branch and is adapted to emit the light away from the measurement system towards the space region and to receive again backscattered light, so that it is guided along the remainder of the measurement branch. The emission and reception means may comprise a receiver which is spatially separated from an emission means (i.e. a bistatic system), or a component which at one location is adapted both for emission and reception of laser light (i.e. a monostatic system). The combined emission and reception means may in particular comprise an optical circulator and/or a lens system.

In a preferred embodiment the interferometer arrangement is constructed in the form of a Mach-Zehnder interferometer having two photodetectors arranged and configured for a balanced reception, wherein the detector signal is a difference of the output signals of the two photodetectors. In this manner it is possible in a manner known per se to remove interferences and perturbations from the detector signal.

In a preferred embodiment the lidar measurement system further comprises a polarization beam splitter arrangement or one or more polarization splitting elements which is or are arranged and adapted to split in operation light of the continuous wave laser source, which is guided along the measurement branch, and light of the continuous wave laser source, which is guided along the reference branch, in each case into light of two orthogonal polarization directions.

In addition, in this embodiment the photodetector arrangement is arranged and adapted to separately detect for the two polarization directions the spatially coherently superimposed light after passing through the measurement branch and the reference branch. Then, the detector signal comprises two sub detector signals, of which each is characteristic of light of one of the two polarization directions. The photodetector arrangement may, for example, comprise two separate, spatially separated photodetectors, and the polarization beam splitter arrangement can be arranged and configured in such a manner that the light of the two polarization directions is only incident on a respective different one of the two photodetectors.

By means of the above arrangement the interference or superposition signals of measurement branch and reference branch are determined, separated according to polarization direction, in exactly the same manner as has been described above independent of the polarization direction. However, due to the separate consideration of the two polarization directions it can be determined by the evaluation unit whether the polarization state has been maintained upon the scattering or reflection, which as a rule is predominantly the case, or whether a shift into the orthogonal polarization state has been effected. If the latter is the case, it is possible in a known manner to make statements regarding the type and shape of the scattering or reflection bodies. Accordingly, the evaluation unit is adapted to determine on the basis of the two sub detector signals changes of the polarization state by the detected particles and/or objects and, if appropriate, to provide information about the type and/or shape of the detected particles and/or objects.

In a preferred embodiment of a lidar measurement system, in which the evaluation unit is adapted to carry out the evaluation on the basis of a function of the detector signal, the predetermined phase function and a time shift value $\Delta t_{shift}$, the laser light generation component is adapted to emit laser light of two wavelengths simultaneously or alternately. Due to the fact that the optical phase modulator influences both wavelengths, the laser light emitted by the continuous wave laser source comprises two wavelength ranges in the vicinity of the two wavelengths, in each of which wavelength ranges the optical power density spectrum has a respective shape and bandwidth determined by the phase function $\theta(t)$.

Furthermore, in this embodiment in the case of a simultaneous emission of both wavelengths by the laser generation component the photodetector arrangement is arranged and adapted to separately detect for the two wavelength ranges the spatially coherently superimposed light after passing through the measurement branch and the reference branch. Then, the detector signal includes two sub detector signals, of which each is characteristic of light of one of the two wavelength ranges. In the case of an emission of the two wavelengths separately in time the detector signals provided during the corresponding time periods correspond to the two sub detector signals.

By means of the above arrangement the interference or superposition signals of measurement branch and reference branch are determined, separated according to the two wavelength ranges, in exactly the same manner as has been described above independent of the wavelength range. If in addition to the scattering particles and/or reflecting objects gas is present between them and the measurement system and this gas absorbs light of the one wavelength range, but in contrast does not absorb or absorbs to a far lesser degree the light of the other wavelength range, it is, however, possible due to the separate consideration of the two wavelength ranges to determine by the evaluation unit the amount of absorbing gas. If the evaluation is now carried out in the described manner for a plurality of different time shift values $\Delta t_{shift}$, each of which corresponds to a respective other sub-portion of the remote space region, it is further possible to determine spatially resolved the concentration of the gas in the different sub-portions. With the exception of the manner according to the invention for achieving spatial resolution this method is known per se and is referred to as DIAL method (differential absorption lidar).

Accordingly, the evaluation unit is adapted to carry out the evaluation on the basis of a function of the two sub detector signals, the predetermined phase function and a plurality of different time shift values $\Delta t_{shift}$, each of which corresponds to a respective other sub-portion of the remote space region, and to determine spatially resolved the concentration of at least one gas which has different absorption coefficients for the two wavelength ranges. Due to the measurement being based on the fact that the laser light is not substantially spectrally broadened upon scattering by thermal motion of the scattering bodies, it is absolutely necessary that suitable particles and/or objects are present in the remote space region in addition to the gas to be measured.

The above-described lidar measurement system, in which the evaluation unit is adapted to carry out the evaluation on the basis of a function of the detector signal, the predetermined phase function and a time shift value $\Delta t_{shift}$, may advantageously be a part of a lidar measurement arrangement which furthermore comprises an optical waveguide, preferably a single mode optical fiber waveguide, which is arranged in such a manner that light of the continuous wave laser source passing through the measurement branch is guided at least in a part of the measurement portion within the optical waveguide, so that the optical waveguide defines at least a part of the measurement portion. In other words, a part or portion of the space region and, in particular, a part or portion of the measurement portion is constituted by the interior of the optical waveguide.

Moreover, the optical waveguide of the measurement arrangement comprises a plurality of reflection means or devices, which are spaced from each other along the optical waveguide and each of which is arranged and adapted to partially reflect at at least one wavelength, at which light can be emitted by the continuous wave laser source, light passing through the optical waveguide away from the measurement system in such a manner that the reflected light passes through the optical waveguide towards the measurement system. These reflection means or devices each constitute a respective object, the presence and/or movement of which can be determined by the measurement system in the manner described. The optical waveguide may preferably comprise at least ten reflection means or devices.

In this embodiment the evaluation unit is adapted to effect the above-described evaluation, which is carried out on the basis of a function of the detector signal, the predetermined phase function and a time shift value $\Delta t_{shift}$, at different points in time and for a plurality of different time shift values $\Delta t_{shift}$, each of which corresponds to a respective other sub-portion of the remote space region, wherein the corresponding plurality of different sub-portions includes different ones of the reflection means or devices and/or different groups of the reflection means or devices.

Moreover, in this embodiment the evaluation unit is adapted to determine from this changes of the reflectivity and/or polarization characteristics of different reflection means or devices, to determine for at least a pair of the reflection means or devices changes of the optical phase shift between the corresponding two reflection means or devices, to determine for at least a pair of the reflection means or devices an attenuation between the corresponding two reflection means or devices, and/or to determine for at least a pair of the reflection means or devices polarization changes between the corresponding two reflection means or devices.

By means of this configuration the lidar measurement arrangement forms or constitutes a fiber optical sensor, in which the reflection means or devices arranged along the optical waveguide constitute individual sensor elements and the fiber optical sensor can be utilized, for example, for strain or elongation measurements in bridges or aircraft wings, or in which the sections of the optical waveguide between adjacent reflection means or devices and the respective two reflection means or devices constitute a respective interferometric sensor element. In any case, by means of suitably choosing the time shift values $\Delta t_{shift}$ the different sensor elements can be separately addressed and evaluated, if each of the sub-portions of the remote space region corresponding to the different time shift values $\Delta t_{shift}$ includes entirely or partially a respective other one of the sensor elements. In this connection it must be noted that in the case of interferometric sensor elements, depending on the bandwidth of the laser light utilized, the sub-portions may have smaller dimensions (high spatial resolution) or larger dimensions (low spatial resolution) than the distance between the two reflection means or devices of the sensor elements. In the former case the two reflection means or devices can be separately evaluated with respect to the phase shift caused by the section of the optical waveguide located between them and/or an attenuation influenced by a measured parameter can be quantified. In the latter case this is not possible and the two mentioned reflection means or devices with the section of the optical waveguide located between them can only be evaluated together. They then form together a sensor element and act like a coherent interferometric sensor.

The reflection means or devices are preferably adapted to change their reflectivity or their polarization characteristics by the influence of a measurement parameter, such as, for example, a temperature. Alternatively it is preferred if the sections of the optical waveguide, which are associated with interferometric sensor elements, are adapted to change their optical path by the influence of a measurement parameter, such as, for example, a strain or elongation. In any case, it is then possible by means of the above-described evaluation to determine the measurement parameter spatially resolved along the optical waveguide.

In a preferred embodiment of the lidar measurement arrangement the reflection means or devices each comprise a respective defect or discontinuity, a Rayleigh backscattering means or device and/or a fiber Bragg grating. A defect or discontinuity can be constituted, for example, by a glass air interface.

In a preferred embodiment of the lidar measurement arrangement the extension of the reflection means or devices in the direction of extension of the optical waveguide is smaller than the minimum distance between adjacent reflection means or devices.

The measurement system described above or the measurement arrangement described above and comprising such a measurement system can be utilized in an advantageous manner for carrying out a method for detecting the presence and/or motion of particles and/or objects in a remote space region. For this purpose, the measurement branch is arranged in such a manner—i.e. in particular the measurement portion is arranged in such a manner—that the remote space region constitutes a part of the measurement portion or, in the extreme case, forms the measurement portion. The continuous wave laser source is operated in order to simultaneously guide laser light in the manner described above along the measurement branch and along the reference branch. The presence and/or movement of particles and/or objects in the remote space region is then determined by means of the evaluation unit in the manner also already described above.

In an advantageous embodiment of the method, in which a lidar measurement system having a continuous wave laser source including an optical phase modulator is utilized, the shape and/or bandwidth of the optical power density spectrum of the laser light emitted by the continuous wave laser source is adjusted or set by adjusting or setting the predetermined phase function $\theta(t)$ at the control device accordingly. In this manner, the spatial resolution can be selectively adapted to the respective requirements.

In an advantageous embodiment of the method, in which a lidar measurement system is utilized comprising a continuous wave laser source, which includes an optical phase modulator, and an evaluation unit adapted to carry out the evaluation on the basis of a function of the detector signal, the predetermined phase function and a time shift value $\Delta t_{shift}$, the time interval $\Delta t_{shift}$ is changed at the evaluation unit in order to change the distance of a sub-portion of the space region from the lidar measurement system, wherein the sub-portion contains the particles the backscattered light of which contributes to the interference at the coherent superposition of the light guided along the measurement branch and of the light guided along the reference branch.

In an advantageous embodiment of the method, in which one of the above-described lidar measurement systems is utilized, which detects light of two different polarization directions, by means of the evaluation unit changes of the polarization state by the detected particles and/or objects are determined on the basis of the two sub detector signals, and information is obtained therefrom about the type and/or shape of the particles and/or objects.

In an advantageous embodiment of the method, in which one of the above-described lidar measurement systems is utilized, which detects light of two different wavelength ranges, the concentration of at least one gas, which has different absorption coefficients for the two wavelength ranges, is determined spatially resolved by means of the evaluation unit on the basis of a function of the two sub detector signals, the predetermined phase function and a plurality of different time shift values $\Delta t_{shift}$, each of which corresponds to another sub-portion of the remote space region.

In an advantageous embodiment of the method using a lidar measurement arrangement the reflection means or devices are adapted in such a manner that they change, depending on a measurement parameter influencing them, their reflectivity and/or their polarization characteristics, or the sections of the optical waveguide, which are respectively located between two adjacent reflection means or devices, are adapted in such a manner that they change, depending on a measurement parameter influencing them, their optical path. In any case, the measurement parameter is determined by means of the evaluation unit at different reflection means or devices or locations corresponding to different sections between reflection means or devices.

In an advantageous embodiment of the method using a lidar measurement arrangement the measurement parameter is a strain or elongation of the optical waveguide, a vibration or oscillation of the optical waveguide and/or a temperature.

In an advantageous embodiment of the method using a lidar measurement arrangement the reflection means or devices are constituted by defects or discontinuities or by Rayleigh backscattering regions, and the optical waveguide is characterized by means of the evaluation unit resolved with respect to length. By means of this method fiber sections can be analyzed by inferring the local attenuation from the change of the detector signal for adjacent measurement locations. This method can replace the use of time domain reflectometers.

Figure 2:
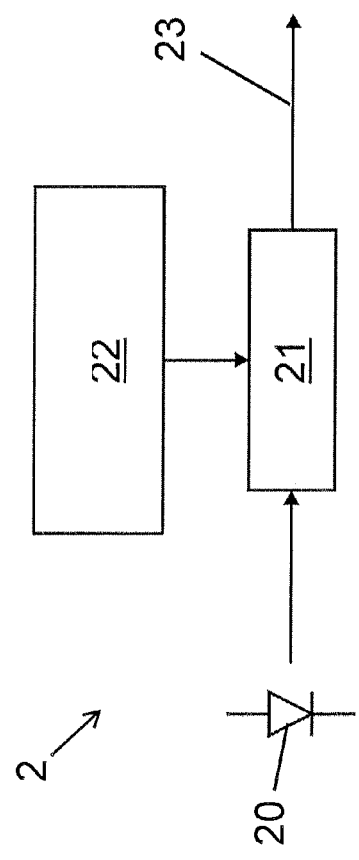
Figure 3:
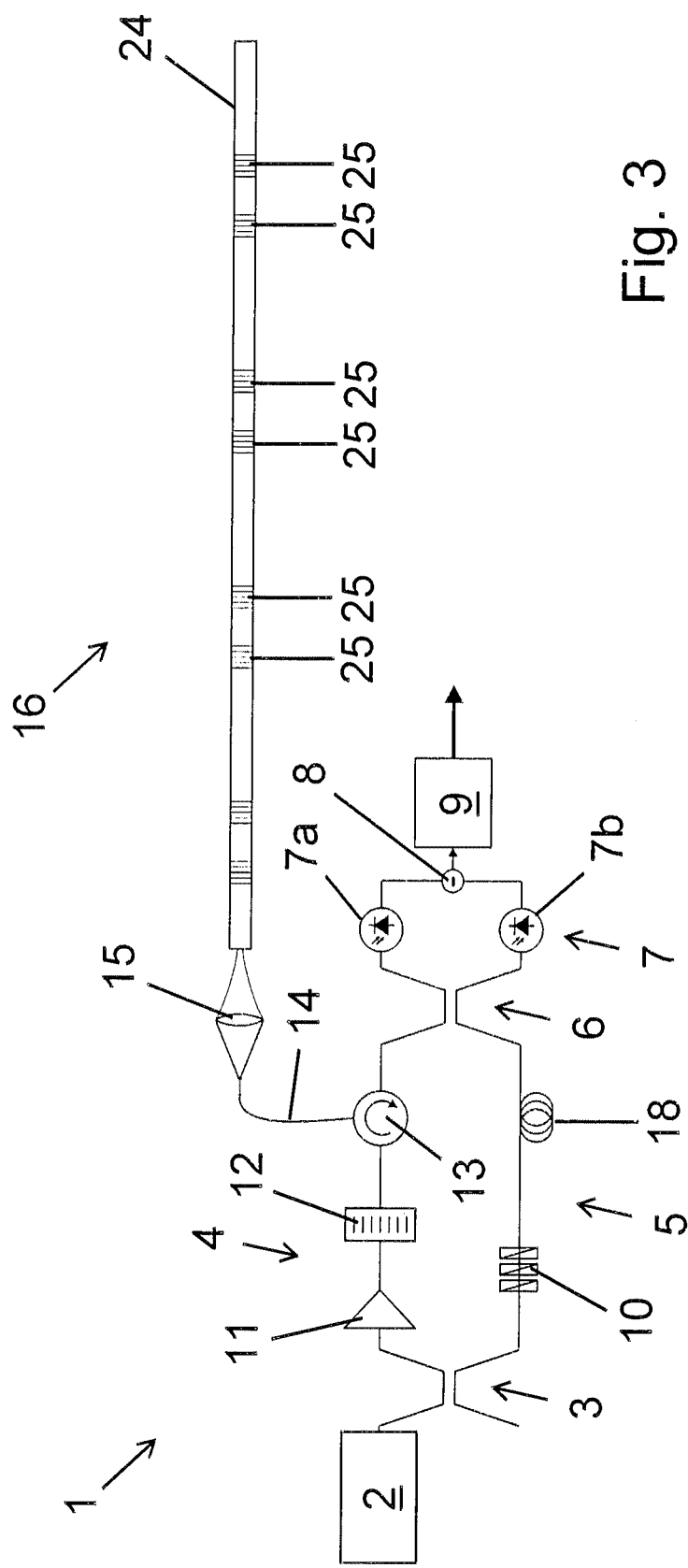

In the following the invention is explained in more detail on the basis of an exemplary embodiment with reference to the appended drawings, in which FIG. 1 shows a schematic representation of a lidar measurement system according to an exemplary embodiment of the invention, and FIG. 2 shows a schematic representation of a continuous wave laser light source according to an exemplary embodiment of the invention, and FIG. 3 shows a schematic representation of a lidar measurement system as part of a lidar measurement arrangement according to an exemplary embodiment of the invention.

The lidar measurement system 1 schematically shown in FIG. 1 comprises a continuous wave laser source 2 having an output power of, e.g., 1 mW and a wavelength of, e.g., 1530 nm, the light of which is divided by a beam splitter 3 in the form of a fiber optical coupler into a measurement branch 4, which is partially defined fiber optically, and a reference branch 5, which is completely defined fiber optically. The optical fibers used are preferably single mode fibers having low attenuation and a field radius of, e.g., 5 µm. At the end of the measurement branch 4 and of the reference branch 5 a further fiber optical coupler 6 for combining the light of the measurement branch 4 and the reference branch 5 is disposed. As in the case of a known Mach-Zehnder interferometer arrangement the light is then coherently superimposed, and different portions of the coherently superimposed light are guided onto the two photodetectors 7a, 7b of the photodetector arrangement 7, which may be, e.g., InGaAs detectors and the detector signals of which, which are characteristic of the light incident on the photodetectors 7a, 7b, are subtracted from each other in a subtraction element 8 for eliminating interferences. The different signal is finally supplied to an evaluation unit 9 in which the different signal is evaluated or analyzed for detecting the presence and/or movement of particles and/or objects.

The reference branch 5 comprises an adjustable fiber optical polarization control element or device 10 and a detour section, for example in the form of a wound section 18 of the fiber. The measurement branch 4 comprises successively an erbium fiber amplifier 11 having an output power of, e.g., 1 W, an acoustooptical modulator 12 having a frequency of, e.g., 80 MHz, and an optical circulator 13.

By means of the circulator 13 light is guided via a fiber section 14 to a transmit/receive lens 15 having a focal length of, e.g., 250 mm, and is focused into the region surrounding the measurement system 1. If within this region light impacts backscattering particles in such a manner that it reaches again the lens 15, it is coupled again into the fiber section 14 and, subsequently, via the circulator 13 into the remainder of the measurement section 4. The region, in which light is at all able to reach again the lens 15 by backscattering at particles, constitutes a measurement portion 16 of the measurement branch 4. The presence and/or movement of particles and/or objects can be detected in the entire measurement portion 16 or only in a part thereof, which is referred to as remote space region in the present application. Thus, the remote space region is the part of the measurement portion 16 which is of interest for a particular measurement.

The continuous wave laser source 2 comprises a laser diode 20 and a downstream optical phase modulator 21, the modulation characteristics of which are controlled by a control device 22 which specifies the phase function θ(t) determining for the modulation and defining a pseudo random noise signal. As compared to the light of the laser diode 20 the laser light 23 emitted by the optical phase modulator 21 or the continuous wave laser source 2 is broadened and deformed in the optical power density spectrum by the modulation as a function of the phase function θ(t).

By taking into consideration different time shift values $\Delta t_{shift}$ during the evaluation by the evaluation unit 9 as described above, it is possible purely by means of calculation and without changes to the described arrangement to carry out the detection spatially resolved and separately for different sub-portions 17 at different distances from the lens 15.

FIG. 3 shows a lidar measurement arrangement comprising a lidar measurement system 1 as also shown in FIG. 1. However, the measurement portion 16 is defined by an optical waveguide in the form of an optical fiber 24, i.e. by the light guiding interior of the fiber 24. Along the fiber 24 a plurality of reflection means or devices 25 are provided spaced from each other in the direction of extension of the fiber 24, each of which partially reflects the light of the continuous wave laser source 2. In this measurement arrangement the reflection means or devices 24 constitute the particles or objects, the presence and/or movement of which is measured and/or for which further characteristics are measured, such as reflection characteristics or polarization characteristics.

The invention claimed is:

1. A lidar measurement system for the detection of the presence and/or motion of particles and/or objects in a space region remote from the lidar measurement system and comprising an interferometer arrangement, wherein the interferometer arrangement comprises:
a continuous wave laser source,
a photodetector arrangement adapted to output a detector signal characteristic of light of the continuous wave laser source incident thereon,
optical components which are adapted and arranged in such a manner that light emitted by the continuous wave laser source is at first split, is subsequently guided along a first optical path, which constitutes a measurement branch of the interferometer arrangement, and along a second optical path, which is separate from the first optical path and constitutes a reference branch of the interferometer arrangement, and after having passed through the measurement branch and the reference branch is eventually incident in a spatially coherently superimposed manner onto the photodetector arrangement, wherein the reference branch has a predetermined optical path length, and the measurement branch comprises a measurement portion, in which the light is directed away from the measurement system towards a space region remote from the measurement system and passes through the space region and light backscattered or reflected towards the measurement system by particles or objects present in the space region is received again at the measurement system, and
an evaluation unit which is coupled to the photodetector arrangement and is adapted to receive the detector signal of the photodetector arrangement and to determine from the detector signal the presence and/or movement of particles and/or objects in the remote space region,
wherein the continuous wave laser source has a coherence length in the range of 0.1 to 100 m.

2. A lidar measurement system according to claim 1, wherein the continuous wave laser source has a coherence length in the range of 1 to 50 m.

3. A lidar measurement system according to claim 1, wherein the continuous wave laser source comprises:
a laser light generation component,
an optical phase modulator which is arranged downstream with respect to the laser light generation component and which is adapted to receive the laser light emitted by the laser light generation component and to modulate it in the phase thereof, wherein the optical phase modulator comprises a control signal input and is adapted to carry out the phase modulation on the basis of a phase function which is defined by a control signal received at the control signal input, and
a control device which is connected to the control signal input of the optical phase modulator and is adapted to provide to the control signal input a control signal corresponding to a pseudo random noise signal defined by a predetermined phase function $\theta(t)$, wherein the control signal has the effect that the optical phase modulator carries out the phase modulation with the predetermined phase function $\theta(t)$, so that the optical power density spectrum of the laser light emitted by the continuous wave laser source is provided with a shape and bandwidth determined by the phase function $\theta(t)$.

4. A lidar measurement system according to claim 3, wherein the predetermined phase function $\theta(t)$ is adjustable.

5. A lidar measurement system according to claim 3, wherein the evaluation unit is adapted to carry out the evaluation on the basis of a function of the detector signal, the predetermined phase function and a time shift value $\Delta t_{shift}$, wherein the function is chosen such that the result of the function corresponds to the detector signal for the case of a propagation time through the reference branch changed by $\Delta t_{shift}$ as compared to the true propagation time through the reference branch.

6. A lidar measurement system according to claim 5, wherein the function includes the multiplication of the detector signal with the factor $e^{-i[\theta(t+\Delta t_{shift})-\theta(t)]}$.

7. A lidar measurement system according to claim 5, wherein
the laser light generation component is adapted to emit laser light of two wavelengths, so that the laser light emitted by the continuous wave laser source comprises two wavelength ranges in the vicinity of the two wavelengths, in each of which wavelength ranges the optical power density spectrum has a respective shape and bandwidth determined by the phase function $\theta(t)$,
the photodetector arrangement is arranged and adapted to separately detect for the two wavelength ranges the spatially coherently superimposed light after passing through the measurement branch and the reference branch, wherein the detector signal includes two sub detector signals, of which each is characteristic of light of one of the two wavelength ranges, and
the evaluation unit is further adapted to carry out the evaluation on the basis of a function of the two sub detector signals, the predetermined phase function and a plurality of different time shift values $\Delta t_{shift}$, each of which corresponds to a respective other sub-portion of the remote space region, and to determine spatially resolved the concentration of at least one gas which has different absorption coefficients for the two wavelength ranges.

8. A lidar measurement arrangement comprising
a lidar measurement system according to claim 5, and
an optical waveguide which is arranged in such a manner that light of the continuous wave laser source passing through the measurement branch is guided at least in a part of the measurement portion within the optical waveguide, so that the optical waveguide defines at least a part of the measurement portion,
wherein the optical waveguide comprises a plurality of reflection means which are spaced from each other along the optical waveguide and each of which is arranged and adapted to partially reflect at least one wavelength, at which light can be emitted by the continuous wave laser source, light passing through the optical waveguide away from the measurement system in such a manner that the reflected light passes through the optical waveguide towards the measurement system,
wherein the evaluation unit is adapted to effect the evaluation on the basis of a function of the detector signal, the predetermined phase function and a time shift value $\Delta t_{shift}$ at different points in time and for a plurality of different time shift values $\Delta t_{shift}$, each of which corresponds to a respective other sub-portion of the remote space region, wherein the corresponding plurality of different sub-portions includes different ones of the reflection means and/or different groups of the reflection means, and to determine from this changes of the reflectivity and/or polarization characteristics of different reflection means, for at least one pair of the reflection means changes of the optical phase shift between the corresponding two reflection means, for at least one pair of the reflection means an attenuation between the corresponding two reflection means, and/or for at least one pair of the reflection means polarization changes between the corresponding two reflection means.

9. A lidar measurement system according to claim 8, wherein the reflection means each comprise a respective defect or discontinuity, a Rayleigh backscattering means and/or a fiber Bragg grating.

10. A lidar measurement system according to claim 8, wherein the extension of the reflection means in the direction of extension of the optical waveguide is smaller than the minimum distance between adjacent reflection means.

11. A lidar measurement system according to claim 1, wherein the optical components comprise:
   a beam splitter for splitting the light emitted by the continuous wave laser source,
   optical fibers, which define at least a portion of the reference branch, and/or optical fibers, which define a portion of the measurement branch,
   an optical frequency shifter, in particular an acoustooptical modulator, in the measurement branch and/or in the reference branch,
   an optical amplifier, in particular an erbium fiber amplifier, in the measurement branch or prior to the division into measurement branch and reference branch,
   an adjustable polarization control device in the reference branch and/or in the measurement branch, and/or
   a beam combiner, in particular a fiber optical coupler, for combining the light guided along the measurement branch and along the reference branch at the end of the measurement branch and of the reference branch.

12. A lidar measurement system according to claim 1, wherein the optical components include an emission and reception means, which defines the beginning and the end of the measurement portion of the measurement branch and is adapted to emit the light away from the measurement system towards the space region and to receive again light backscattered in the space region, so that it is guided along the remainder of the measurement branch.

13. A lidar measurement system according to claim 12, wherein
   the laser light generation component is adapted to emit laser light of two wavelengths, so that the laser light emitted by the continuous wave laser source comprises two wavelength ranges in the vicinity of the two wavelengths, in each of which wavelength ranges the optical power density spectrum has a respective shape and bandwidth determined by the phase function θ(t),
   the photodetector arrangement is arranged and adapted to separately detect for the two wavelength ranges the spatially coherently superimposed light after passing through the measurement branch and the reference branch, wherein the detector signal includes two sub detector signals, of which each is characteristic of light of one of the two wavelength ranges, and
   the evaluation unit is further adapted to carry out the evaluation on the basis of a function of the two sub detector signals, the predetermined phase function and a plurality of different time shift values $\Delta t_{shift}$, each of which corresponds to a respective other sub-portion of the remote space region, and to determine spatially resolved the concentration of at least one gas which has different absorption coefficients for the two wavelength ranges.

14. A lidar measurement system according to claim 1,
   which further comprises a polarization beam splitter arrangement which is arranged and adapted to split in operation light of the continuous wave laser source, which is guided along the measurement branch, and light of the continuous wave laser source, which is guided along the reference branch, in each case into light of two orthogonal polarization directions, and
   wherein the photodetector arrangement is arranged and adapted to separately detect for the two polarization directions the spatially coherently superimposed light after passing through the measurement branch and the reference branch, wherein the detector signal comprises two sub detector signals, of which each is characteristic of light of one of the two polarization directions,
   wherein the evaluation unit is further adapted to determine on the basis of the two sub detector signals changes of the polarization state by the detected particles and/or objects.

15. A lidar measurement system according to claim 14, wherein
   the laser light generation component is adapted to emit laser light of two wavelengths, so that the laser light emitted by the continuous wave laser source comprises two wavelength ranges in the vicinity of the two wavelengths, in each of which wavelength ranges the optical power density spectrum has a respective shape and bandwidth determined by the phase function θ(t),
   the photodetector arrangement is arranged and adapted to separately detect for the two wavelength ranges the spatially coherently superimposed light after passing through the measurement branch and the reference branch, wherein the detector signal includes two sub detector signals, of which each is characteristic of light of one of the two wavelength ranges, and
   the evaluation unit is further adapted to carry out the evaluation on the basis of a function of the two sub detector signals, the predetermined phase function and a plurality of different time shift values $\Delta t_{shift}$, each of which corresponds to a respective other sub-portion of the remote space region, and to determine spatially resolved the concentration of at least one gas which has different absorption coefficients for the two wavelength ranges.

16. A method for detecting the presence and/or motion of particles in a remote space region using a lidar measurement system including an interferometer having a measurement branch and a reference branch, the measurement branch including a measurement portion, in which light is directed away from the lidar measurement system towards the remote space region, a continuous wave laser source having a coherence length in a range of 0.1 to 100 m, and an evaluation unit used to determine the presence and/or movement of particles and/or objects in a remote space region, the method comprising:
   arranging the measurement branch in such a manner that the remote space region is a part of the measurement portion,
   operating the continuous wave laser source in order to simultaneously guide laser light along the measurement branch and along the reference branch, and determining the presence and/or movement of particles and/or objects in the remote space region by means of the evaluation unit.

17. A method according to claim 16, wherein the method is performed using a lidar system including a control device adapted to provide a predetermined phase function θ(t) to an optical phase modulator, the method further comprising adjusting a shape and/or bandwidth of an optical power density spectrum of laser light emitted by the continuous wave laser source by adjusting the predetermined phase function θ(t) at the control device accordingly.

18. A method according to claim 16, further comprising changing a time interval $\Delta t_{shift}$ at the evaluation unit in order to change the distance of a sub-portion of the remote space region from the lidar measurement system, wherein the sub-portion contains the particles the backscattered light of which contributes to the interference at the coherent superposition of light guided along the measurement branch and of light guided along the reference branch.

19. A method according to claim 16, wherein the method is performed using a lidar system including a photodetector arrangement arranged and adapted to separately detect for two polarization directions spatially coherently superimposed light after passing through the measurement branch and the reference branch, wherein the detector signal comprises two sub detector signals, of which each is characteristic of light of one of the two polarization directions, the method further comprising determining changes of the polarization state by the detected particles and/or objects on the basis of the two sub detector signals, and information is obtained therefrom about the type and/or shape of the particles and/or objects.

20. A method according to claim 16, wherein the method is performed using a lidar system including a laser light generation component adapted to emit laser light of two wavelengths, so that the laser light emitted by the continuous wave laser source comprises two wavelength ranges in the vicinity of the two wavelengths, in each of which wavelength ranges the optical power density spectrum has a respective shape and bandwidth determined by the phase function θ(t), a photodetector arrangement arranged and adapted to separately detect for the two wavelength ranges spatially coherently superimposed light after passing through the measurement branch and the reference branch, wherein the detector signal includes two sub detector signals, of which each is characteristic of light of one of the two wavelength ranges, the method further comprising determining the spatially resolved concentration of at least one gas, which has different absorption coefficients for the two wavelength ranges, on the basis of a function of the two sub detector signals, the predetermined phase function and a plurality of different time shift values $\Delta t_{shift}$, each of which corresponds to another sub-portion of the remote space region.

21. A method according to claim 16, wherein the method is performed using a lidar system including a plurality of reflection means which are spaced from each other along the optical waveguide, the method further comprising:
    changing a reflectivity and/or polarization characteristic of the reflection means depending on a measurement parameter influencing them or changing an optical path of the sections of the optical waveguide located between two adjacent reflection means depending on a measurement parameter influencing them; and
    determining a measurement parameter at different reflection means or locations corresponding to different sections between reflection means.

22. A method according to claim 21, wherein the measurement parameter is a strain or elongation of the optical waveguide, a vibration or oscillation of the optical waveguide and/or a temperature.

23. A method according to claim 21, wherein the optical waveguide is characterized by means of the evaluation unit resolved with respect to length.

\* \* \* \* \*